Aug. 20, 1963
M. BERCHTOLD
3,101,168
AERODYNAMIC WAVE MACHINE FORMED ROTOR BLADES
TO MINIMIZE THERMAL STRESS
Filed June 15, 1961
2 Sheets-Sheet 1
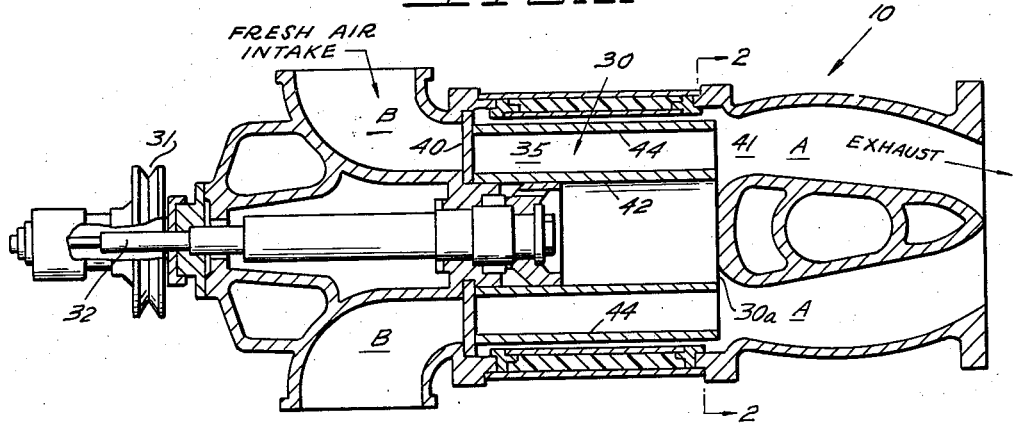
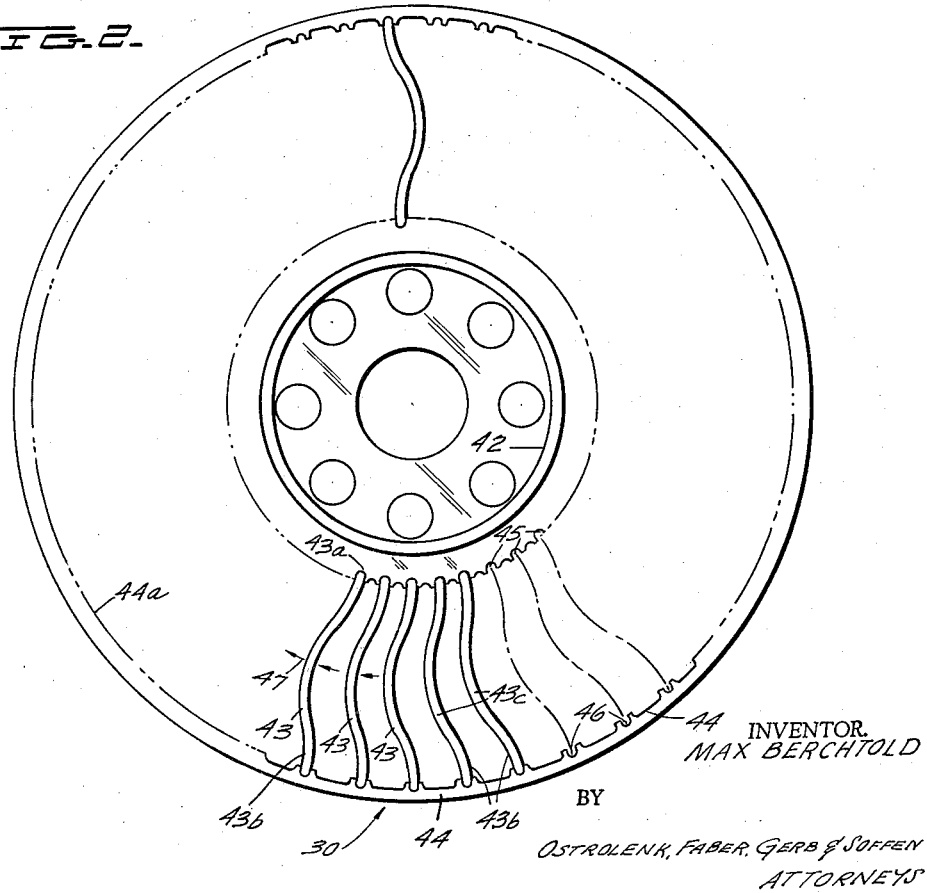
INVENTOR.
MAX BERCHTOLD
BY
OSTROLENK, FABER, GERB & SOFFEN
ATTORNEYS Aug. 20, 1963 M. BERCHTOLD 3,101,168
AERODYNAMIC WAVE MACHINE FORMED ROTOR BLADES
TO MINIMIZE THERMAL STRESS
Filed June 15, 1961 2 Sheets-Sheet 2

INVENTOR.
MAX BERCHTOLD
BY
OSTROLENK, FABER, GERB & SOFFEN
ATTORNEYS

3,101,168
AERODYNAMIC WAVE MACHINE FORMED ROTOR BLADES TO MINIMIZE THERMAL STRESS
Max Berchtold, Kusnacht, Switzerland, assignor to I-T-E Circuit Breaker Company, Philadelphia, Pa., a corporation of Pennsylvania
Filed June 15, 1961, Ser. No. 117,199
8 Claims. (Cl. 230—69)

My invention relates to rotor blades and more particularly to rotor blades for use in aerodynamic wave machines wherein the blades are designed so as to minimize thermal stresses.

In many types of rotating equipment, it is necessary to provide a plurality of blades extending from a rotor. A particular example of this is in the aerodynamic wave machines of the type described and illustrated in U.S. Patent No. 2,970,745 entitled, "Wave Machine," issued February 7, 1961 to Max Berchtold and assigned to the assignee of the instant invention. In wave machines of the type described in the above patent, a plurality of channels are formed around a rotor hub in order to guide the passage of fluids having great variations in temperature and pressure. Since these rotating devices operate at a relatively high speed (a rotor six inches in diameter revolves at approximately 8,000 r.p.m.), it is essential to provide securing means for the blades forming the channels so that the rotor structure can withstand centrifugal forces. The elements of this structure have to be designed to permit expansion and contraction due to the uneven temperature distributions without repeated plastic deformation leading to unbalance or mental failure.

Prior art rotors are comprised of a hub, a plurality of radially aligned blades and shroud. The thin walled hub has a plurality of straight dovetailed or re-entrant grooves into which the blades of matching shape are inserted. Similar dovetailed joints are used at the points where each blade connects with the shroud.

If the rotor is used in an aerodynamic wave machine with a reverse cycle, for instance to supercharge an internal combustion engine, the temperature distribution between the hot end and the cold end of the rotor is approximately linear. Hence, the original cylindrical shape of the hub expands to a conical shape due to the temperature gradient. It is therefore important that the hot end of the rotor is free to expand. A cantilever shaft arrangement whereby shaft is attached to the rotor hub near the cold end presents the most desirable solution.

The blades and shroud being thinner than the rotor hub follow temperature changes faster than the hub. Thus it is necessary to have a rotor structure that is sufficiently flexible to yield to thermal expansion without undergoing permanent distortion. This requirement led to the development of a shroud comprised of a plurality of segments having overlapping joints which act to seal the fluid passing through the channels to prevent any leakage through the shroud. The splits between the shroud segments were shaped so that leakage along the joint was minimized.

Although the radial stresses imposed upon the rotor blades during rotation are not exceedingly large, the pulsating side loads acting on the rotor blades, however, make it necessary to employ a dovetail joint structure between blades and shroud without any play or clearance between the rotor blades and the shroud segments. During the rotation of the wave machine, the clearances in the dovetailed joints increase with time. Ultimately the blades slip out of the grooves provided in the shroud or break due to the continuous work hardening imposed upon the blades.

One method of correcting this has been to furnace braze the rotor assembly. It is, however, difficult and unreliable to avoid the brazing of the shroud expansion joints. It has been found that the joints between the shroud segments get damaged severely in the case of any slight rub between the rotor and the stator.

The use of a mono-shroud rotor has been found to eliminate the shroud expansion joint brazing problem, but since it is necessary to braze the blades to the hub and the shroud for reasons explained above, some other flexible element was needed in order to take up the differences in thermal expansion.

The novel rotor of my invention is adapted to permit a more even distribution of the thermal stresses along the rotor length thereby minimizing the stresses existing between the hub and blade joints and the shroud and blade joints.

The rotor of my invention is comprised of a hub having a plurality of grooves each extending parallel to the axis along the cylindrical surface of the hub. The rotor blades are inserted into these hub grooves so that the blades extend radially outward from the hub axis. The continuous shroud has a plurality of grooves extending longitudinally along the inner surface of the shroud, each groove being positioned to cooperate with a longitudinal outer edge of an associated rotor blade, the longitudinal edge being inserted into its associated shroud groove. The joints between the shroud and the blades and the hub and the blades are then brazed to eliminate any possible slack of the blades in the groove leading to loosening of the blades.

Each rotor blade is designed to have a curved profile in the radial direction as can best be seen in a cross-sectional view of the rotor. The curved blades are arranged so that the blade curvatures all face in the same direction around the rotor.

In operation, due to the curved orientation of the rotor blades, different thermal expansion of the blades, the hub and the shroud can be taken up by a change of the blade shape. Due to the bent form, the blade is free to move readily in the sideways direction. For this reason, the radial expansion of the blades remains compatible with the expansion of the hub and the expansion of the shroud, thus resulting in a greatly increased rotor operating life.

The amount of flexibility introduced into the blades is dependent upon the temperature gradient along the length of the rotor to which the blades will be exposed. The rotor blades employed in rotors having such a linear temperature gradient are designed to have a severe or sharp curvature at one blade end which curvature gradually broadens towards the opposite blade end which is exposed to less severe temperature changes.

Since the performed blade arrangement permits an even distribution of the side load forces throughout the entire rotor the bending stresses on each rotor blade is reduced substantially thereby permitting the use of rotor blades having reduced thicknesses as distinguished from blades used in prior art wave machines. Since the shroud carries its own centrifugal stresses, the radial stresses between the blades and the stresses in the hub joints are also reduced over the previous design thus enabling the use of a simpler joint design between the rotor blades and the associated shroud and hub grooves. Instead of the dovetail foot, a straight slot can be used. Brazing is applied to eliminate all slack in the groove and to hold the blades axially.

The curved rotor blade may also be curved in the longitudinal direction at or near one blade end for a turbine action, that is, in order to reduce the driving power required by the rotor. The curved profile of the blade can change along the rotor axis. The curvature can be accentuated with increasing temperature, in order to provide more flexibility where it is needed.

It is therefore one object of my invention to provide a rotor blade which is so arranged as to provide a unique radial expansion when exposed to thermal stresses.

Another object of my invention is to provide a rotor for an aerodynamic wave machine having novel rotor blades which are arranged to minimize rotor thermal stresses.

Another object of my invention is to provide a rotor for an aerodynamic wave machine having novel rotor blades which permit the use of a continuous rotor shroud.

Still another object of my invention is to provide a rotor for an aerodynamic wave machine having a continuous shroud which is so designed as to eliminate fluid leakage along the shroud joints.

These and other objects of my invention will be apparent when taken in connection with the accompanying description and drawings, in which:

FIGURE 1 is a side plan view of an aerodynamic wave machine employing my novel rotor configuration.

FIGURE 2 is a cross-sectional view of the rotor shown in FIGURE 1 taken along the line 2—2'.

Figure 3:
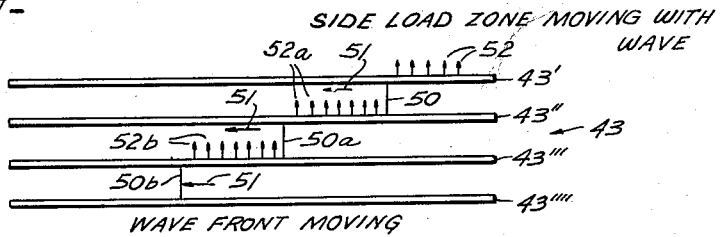
FIGURE 3 is an end view of the rotor blades shown in FIGURE 1 showing the side loads experienced by the blades.

Referring now to the drawings, FIGURE 1 shows an aerodynamic wave machine 10 which is comprised of a rotor 30 driven for rapid rotation about its axis in any suitable manner such as by a belt drive over pulley 31 to the rotor shaft 32. The rotor is a drum having an outer shell or shroud 44 and a plurality of cells 35 extending more or less parallel to the axis of the rotor and adjacent the periphery thereof.

Two stators 40 and 41 are placed on opposite sides of the rotor 30 in the closest possible proximity thereto consistent with the high-speed rotation required in the rotor 30 to obtain the best possible gas-tight seal. The stator 41 on the right side of the rotor 30 is provided with ports for the introduction and/or removal of gases so as to permit the flow of these gases through the channels 35. Stator 40 on the left side of the rotor 30 is provided with ports of the same nature as stator 41 which ports cooperate with the rotor channels 35 in a manner similar to the ports of stator 41.

A variety of port arrangements may be obtained in wave machine 10, one possibility being that all hot gases are introduced and removed through the left-hand stator 40 while all cool gases enter and leave the rotor through end plate 41. In an arrangement such as this, a cantilever rotor 30 joined to shaft 32 can be used to advantage in this reverse cycle system since there need not be a bearing on the hot side and hence hot bearing trouble can be eliminated. Also, the cold stator 41 can be cast from a light alloy such as aluminum or magnesium since it will not have to withstand high temperatures. It should be noted that although thermal stresses are substantially reduced or eliminated in the stator of the reverse cycle device, there are nevertheless extreme temperature gradients in the rotor 30. It is, therefore, necessary to have a high degree of flexibility on the hot end 30a of rotor 30. The cantilever shaft arrangement allows the hot end 30a of the rotor to expand without causing excessive thermal stresses.

The rotor 30 is rotated at a speed which produces the required timing for the compression and expansion waves of the interfaces with respect to the ports in each stator end plate 40 and 41 respectively. The individual cells of the rotor 30 move successively past the stator ports, the hot and cold fluids being introduced therein accordingly. Although the blades 43 (see FIGURE 2) may reach an average temperature once the wave machine has reached a steady state operating condition, the rotor blades 43 are nevertheless subjected to a large temperature change from starting to normal operating conditions making it necessary to provide for their expansion without introducing additional stresses upon the rotor 30.

The rotor 30 is comprised of a hub 42, a plurality of rotor blades 43 and a rotor outer shroud 44. The hub 42 has a plurality of axially extending grooves 45 which extend from one end of the rotor to the opposite end. The rotor shroud 44 also carries the plurality of grooves 46 along its inner surface 44a which grooves extend longitudinally thereon. Rotor hub grooves 45 accommodate ends 43a of blades 43 while grooves 46 receive ends 43b of blades 43. Each blade 43 has a radial profile having a curved central portion 43c. The curved portion of all blades 43 extends in the same direction throughout the rotor. The joints which are composed of blade ends 43a and grooves 45 and blade ends 43b and grooves 46 are brazed in any well known manner such as by furnace brazing or dip brazing subsequent to the assembly of the rotor. The brazing operation reduces the clearance between the blade ends and the hub and shroud grooves 44 and 46 respectively to zero thus preventing any possibility of the blades becoming loose due to vibration.

During the period in which the wave machine begins its rotation, rotor 30 experiences a large temperature increase causing the hub 42, shroud 44 and especially the blades 43 to undergo a substantial amount of thermal expansion. The preformed curvatures 43c of each blade 43 acts to urge any expansion of the rotor blade in the direction of the curvature 43c. Also since the blades 43 of the rotor are all of the same configuration and formed of the same material the stresses imposed upon the blades are distributed equally among the blades and circumferentially with respect to the rotor axis. Any expansion which takes place in the hub 42 and/or shroud 44 is also absorbed by the flexible rotor blades 43, the buckling of the blades 43 acting to compensate for the fact that the blade ends 43a and 43b have been secured by the brazing operation.

In FIGURE 3, the blades 43 are shown as viewed from a point outside the shroud 44 of FIGURE 1 wherein the shroud has been removed so that the longitudinal edges of the blades 43 are exposed. Only a few of the blades 43 are represented in FIGURE 3 for the purpose of simplicity. The wave fronts 50, 50a and 50b are shown moving in the direction 51, the wave front 50 in moving between blades 43' and 43'' in the direction of arrow 51 impresses a sidewise force upon blade 43' which is represented by force arrows 52. Likewise wave fronts 50a and 50b create sidewise forces 52a and 52b upon rotor blades 43'' and 43''' respectively. As can be seen from FIGURE 3 these forces follow immediately behind their respective wave fronts 50, 50a and 50b and move along with the wave fronts so that the forces are moving forces along the rotor blades 43' through 43'''. The effect of these forces in the blades is much more predominant than the forces due to thermal expansion. The curved blades offer little resistance to the difference in expansion of the hub, the shroud and the blades itself but the local sidewise forces 52 through 52b are effectively distributed over the full length of the blade thus reducing the bending stresses considerably. This curved design makes it possible to reduce the thickness of the rotor blades as a direct result. This in return reduces the stiffness of the blade in radial direction. Since the joints at the hub have to transmit the centrifugal forces of the blades only with the small forces produced by the differential thermal expansion a simplified joint design with straight slots instead of the dovetailed slots can be used.

Figure 5:
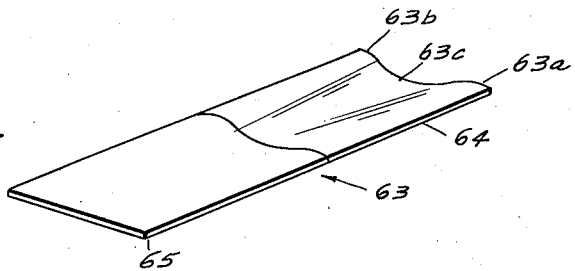
FIGURE 5 is a perspective view of another preferred embodiment of the rotor blade.

In cases where the rotor blade experiences larger temperature differentials at one end than is experienced at the opposite end such as was described above, the radial profile of the blade may be arranged in the manner set forth in FIGURE 5 wherein the right hand end 64 of rotor blade 63 has a curvature 63c between rotor edges 63a and 63b, whereas the left hand end 65 of rotor blade 63 is fully or nearly straight. The curvature of the blade 63 increases smoothly and gradually from left-hand end 65 to right-hand end 64 until the most accentuated curvature is obtained at the right-hand end 64. This permits the blade to have a straight radial profile near the cold end of the rotor where the temperatures of the rotor hub and rotor shroud are more nearly alike and which end experiences little, if any, thermal expansion.

Figure 4:
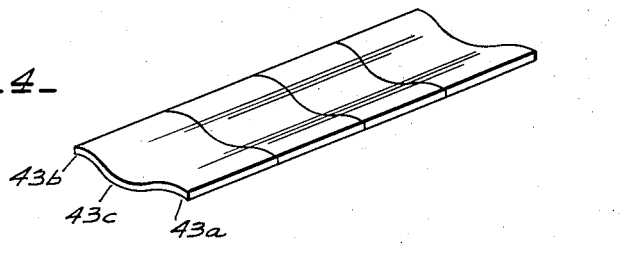
FIGURE 4 is a perspective view of a rotor blade employed in the rotor of FIGURES 1 and 2.
Figure 6:
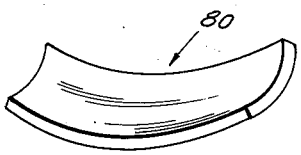
FIGURES 6 and 7 are perspective views of rotor blades having longitudinal configurations differing from the rotor blades of FIGURES 4 and 5 and which incorporate the novel radial profile design of my invention in order to minimize thermal expansion.
Figure 7:
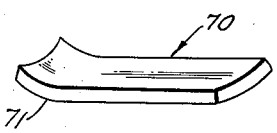

The rotor blade radial profile of the instant invention may also be utilized in wave machines having rotors which are either self-driven or which are partially self-driven by the use of rotor blades such as the rotor blade 70 of FIGURE 7. The left hand end 71 of rotor blade 70 is curved in order to produce a turbine action in the wave machine rotor. For a greater turbine action, a rotor blade having a curve along its entire length such as rotor blade 80 of FIGURE 6 may be employed. It can be noted that the curved radial profile of this invention may be employed in either type of blade thus allowing the use of a continuous shroud without excessive thermal stresses. It should also be noted that a radial curvature of the nature shown in FIGURES 6 and 7 may be substituted for the curvature 43c shown in FIGURES 2 and 4 since both profiles have produced satisfactory results with regard to the reduction of thermal stresses.

In addition to the blades set forth in the figures included herein blades which are mounted in the rotor in helical fashion so that a straight line along the rotor blade length forms an acute angle with the rotor axis also may be designed with a curved radial profile of the nature of the blades described above.

It can be seen from the foregoing that I have provided a brazed mono-shroud rotor with radially flexible blades which can compensate for differential thermal expansion in transient and steady state operating conditions without permanent deformation. The blade design avoids the need for expansion splits in the shroud as taught by the prior art which joints are possible sources of fluid leakage losses. The mono-shroud assembly also permits the brazing operation to be performed in a manner which requires less time and expense and which reduces the complexity of rotor fabrication.

In the foregoing I have described my invention solely in connection with specific illustrative embodiments thereof. Since many variations and modifications of my invention will now be obvious to those skilled in the art, I prefer to be bound not by the specific disclosure herein contained but only by the appended claims.

I claim:

1. A rotor for a wave machine comprising a circular shaft, a cylindrical shroud surrounding said shaft, a plurality of blades each positioned substantially in a radial direction between said shaft and said shroud, opposite axial edges of each of said blades being secured to the outer surface and the inner surface of said shaft and said shroud respectively, a first radial edge of each of said blades being curved in a direction away from a radial line extending between said shaft and said shroud, the radial blade edge opposite said curved edge being substantially straight, the radius of curvature of said blade gradually and smoothly increasing between said curved and said straight radial edges.

2. An aerodynamic wave machine comprising first and second stator plates, a rotor mounted for rotation between said stator end plates, the axis of said rotor being perpendicular to said stator end plates, said rotor having a plurality of channels for the passage of gases each having a first and a second opening adjacent said first and second stator end plates respectively, each of said end plates having at least one port for the passage of said gases, a plurality of blades extending substantially radially from the axis of said rotor for forming said channels, said blades being fixedly secured along their inner and outer axial edges to said rotor, a first radial end of each of said blades adjacent said first stator end plate being substantially straight, a second radial end opposite said first end being curved away from a radial line extending outward from the central axis of said rotor, the curvature of each of said blades increasing smoothly and uniformly between said first and second radial edges.

3. An aerodynamic wave machine comprising first and second stator plates, a rotor mounted for rotation between said stator end plates, the axis of said rotor being perpendicular to said stator end plates, said rotor having a plurality of channels for the passage of gases each having a first and a second opening adjacent said first and second stator end plates respectively, each of said end plates having at least one port for the passage of said gases, a plurality of blades extending substantially radially from the axis of said rotor for forming said channels, said blades being fixedly secured along their inner and outer axial edges to said rotor, a first radial end of each of said blades adjacent said first stator end plate being substantially straight, a second radial end opposite said first end being curved away from a radial line extending outward from the central axis of said rotor, the curvature of each of said blades increasing smoothly and uniformly between said first and second radial edges, a driving means, said rotor being cantilever mounted to said driving source to permit maximum thermal expansion of the free end of said stator.

4. A rotor for a wave machine comprising a circular shaft, a circular shroud surrounding said shaft, at least one blade positioned substantially in a radial direction between said shaft and said shroud, said blade being curved along its entire axial length to form a first, second and third arc intermediate the axial edges of said blade; said second arc interposed between said first and third arcs and meeting said first and third arcs at respective inflection points.

5. A rotor for a wave machine comprising a circular shaft, a cylindrical shroud surrounding said shaft; a plurality of blades each positioned substantially in a radial direction between said shaft and said shroud, said blades forming a plurality of channels around said rotor between said shaft and said shroud for the passage of gases; each of said blades being curved along its entire axial length to form a first, second and third arc intermediate the axial edges of said blades; said second arc interposed between said first and third arcs and meeting said first and third arcs at respective inflection points; said blades being adopted to bend in the direction of said curvature due to thermal stresses imposed upon said blades due to the passage of said gases.

6. A rotor for an aerodynamic wave machine comprising a rotatable hub; a shroud surrounding said hub, a plurality of blades positioned between said hub and said shroud, each of said blades having first and second opposing axial edges fixedly secured to said hub and said shroud respectively, said blades being curved to form a first, second and third arc intermediate said first and second axial edges, said second arc interposed between said first and third arcs and meeting said first and third arcs at respective inflection points; said curvature being uniform along the entire axial length of said blade; each of said blades around said hub being curved in the same direction.

7. An aerodynamic wave machine comprising first and second stator plates, a rotor mounted for rotation between said stator plates, the axis of said rotor being perpendicular to said stator end plates, said rotor having a plurality of channels for the passage of gases each having a first and a second opening adjacent said first and second stator end plates respectively, each of said end plates having at least one port for the passage of said gases, a plurality of blades extending substantially radially from the axis of said rotor for forming said channels, said blades being fixedly secured along their inner and outer axial edges to said rotor and being curved to form a first, second and third arc intermediate said inner and outer axial edges, said second arc interposed between said first and third arcs and meeting said first and third arcs at respective inflection points; said curvature extending the entire axial length of each of said blades.

8. An aerodynamic wave machine comprising first and second stator plates, a rotor mounted for rotation between said stator end plates, the axis of said rotor being perpendicular to said stator end plates, said rotor having a plurality of channels for the passage of gases each having a first and a second opening adjacent said first and second stator end plates respectively, each of said end plates having at least one port for the passage of said gases, a plurality of blades extending substantially radially from the axis of said rotor for forming said channels, said blades being fixedly secured along their inner and outer axial edges to said rotor and being curved to form a first, second and third arc intermediate said inner and outer axial edges, said second arc interposed between said first and third arcs and meeting said first and third arcs at respective inflection points; said curvature extending the entire axial length of each of said blades, each of said blades being curved at one end thereof in a direction transverse to the rotor axis to provide a turbine effect during operation of said aerodynamic wave machine.

References Cited in the file of this patent

UNITED STATES PATENTS

| | | |
|---|---|---|
| 2,675,173 | Jendrassik | Jan. 13, 1954 |
| 2,867,981 | Berchtold | Jan. 13, 1959 |
| 2,904,246 | Pearson | Sept. 15, 1959 |
| 2,959,344 | Niedermann | Nov. 8, 1960 |

FOREIGN PATENTS

| | | |
|---|---|---|
| 840,408 | Great Britain | July 6, 1960 |
| 1,214,693 | France | Nov. 9, 1959 |